Dec. 6, 1960
E. E. SNEESBY ET AL
2,963,676
ELECTRICAL OUTLET
Filed Sept. 16, 1957
2 Sheets-Sheet 1
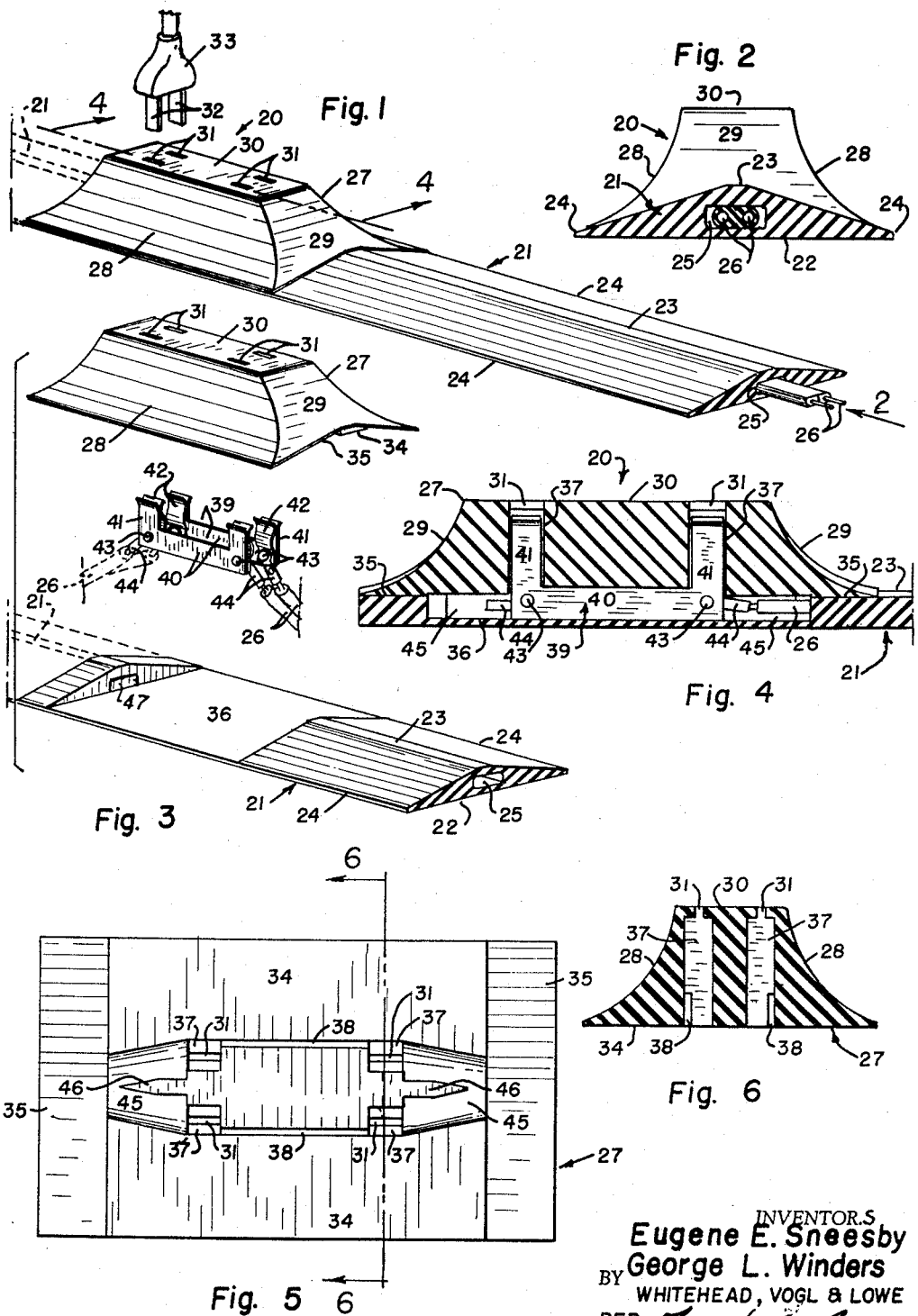
INVENTORS
Eugene E. Sneesby
George L. Winders
BY WHITEHEAD, VOGL & LOWE
PER Frank C. Lowe
ATTORNEYS

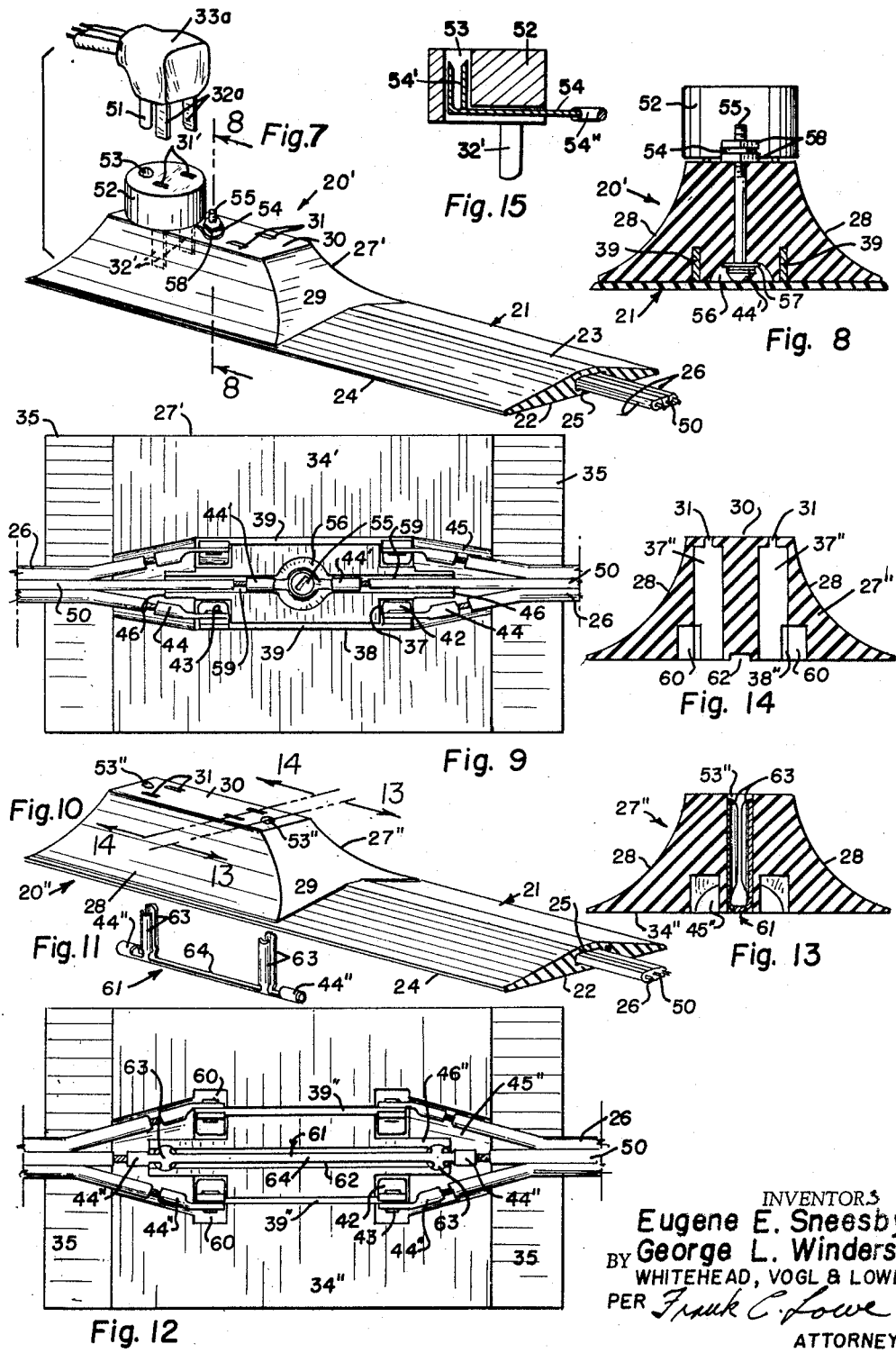

United States Patent Office 2,963,676
Patented Dec. 6, 1960

2,963,676
ELECTRICAL OUTLET
Eugene E. Sneesby and George L. Winders, Casper, Wyo., assignors to Electriduct Company, Casper, Wyo., a copartnership
Filed Sept. 16, 1957, Ser. No. 684,038
4 Claims. (Cl. 339—23)

This invention relates to electrical ducts and extension cords, and more particularly to pre-formed ducts of a type which are especially adapted to be laid across and affixed to a floor or like flat surface and to be either exposed or concealed beneath rugs and like coverings, and as such, will be hereinafter referred to as "floor ducts." More specifically, the invention relates to outlets in such pre-formed ducts and a primary object of the invention is to provide a novel and improved outlet in a pre-formed floor duct which will be hereinafter referred to as a "floor duct outlet" or simply as an "outlet."

Reference is made to our prior Patents No. 2,595,452, issued May 6, 1952, and No. 2,636,520, issued April 28, 1953. These patents disclose a molded rubber type of floor duct which is especially adapted to be used in connection with the present invention, a floor duct outlet. The floor duct disclosed in these patents may be generally described as an elongated member having a uniform cross section throughout its length and being formed preferably from a rubber-like resilient, non-conductor material which may be flexed along its length but is sufficiently rigid to maintain its general shape. In preferred construction this type of floor duct has a generally flat bottom surface, a relatively thick central portion forming a central longitudinal ridge and relatively thin longitudinal edges. A longitudinal conduit passageway extends through the duct at the relatively thick central portion to receive electrical wires and the like. It follows that another object of the invention is to provide an outlet for a floor duct such as disclosed in the reference patents.

Further objects of the invention are to provide a novel and improved floor duct outlet which: (a) structurally combines with and blends into the body of a floor duct, (b) is especially adapted to be manufactured in conjunction with, and set up as part of a floor duct requiring no actual installation beyond the laying of the floor duct itself, (c) is equally well adapted to be placed at a terminating end of a floor duct or at an intermediate station along the duct, (d) is equally well adapted to be formed to receive and accommodate conventional outlet connecting plugs or to receive and accommodate heavy duty grounded outlet connecting plugs, and (e) is a low-cost, neat-appearing, compact, rugged and durable duct outlet.

With the foregoing and other objects in view, all of which more fully hereinafter appear, our invention comprises certain novel and improved constructions, combinations and arrangements of parts and elements as hereinafter described and as defined in the appended claims and illustrated in preferred embodiment in the accompanying drawing in which:

Figure 1 is an isometric view of the terminal end portion of a duct having the improved outlet affixed thereon and with a plug positioned for insertion into the outlet and illustrating further, in broken lines, a continuation of the duct as if the outlet were placed in an intermediate position in the duct.

Figure 2 is an end elevation view of the duct portion and outlet thereon as from the indicated arrow 2 at Fig. 1.

Figure 3 is an isometric exploded view of the elements forming the duct and outlet shown at Fig. 1, and with broken line portions indicating wire connections and extension of the duct, as if the outlet were located at an intermediate position in the duct, rather than at a terminal end thereof.

Figure 4 is a longitudinal sectional elevation view as taken substantially from the indicated line 4—4 at Fig. 1 but on an enlarged scale.

Figure 5 is a bottom view of the outlet shell per se with conduit connecting elements removed.

Figure 6 is a transverse sectional elevation view of the outlet shell per se, as taken from the indicated line 6—6 at Fig. 5.

Figure 7 is an isometric view similar to Fig. 1 but showing the outlet modified with a grounding adapter to receive a grounded plug shown in position for insertion into the adapter.

Figure 8 is a transverse section through the outlet as taken from the indicated line 8—8 at Fig. 7 but on an enlarged scale.

Figure 9 is a bottom view of the outlet shell and wiring therein arranged for a grounding adapter in accordance with the construction illustrated at Fig. 7 but without the duct being in place and with the wiring extending from both sides of the shell as if the outlet were located at an intermediate position in the floor duct.

Figure 10 is an isometric view similar to Fig. 1 but showing the outlet modified to accommodate the grounded plug shown at Fig. 7 directly and without the use of a grounding adapter.

Figure 11 is an isometric view of an electrical connector which provides grounding clips for use in unit illustrated at Fig. 11.

Figure 12 is a bottom view of the outlet shell and wiring therein arranged in accordance with the construction illustrated at Fig. 10 but without the duct being in place and with the wiring extending from both sides of the shell as if the outlet were located at an intermediate position in the floor duct.

Figure 13 is a transverse section of the shell as taken substantially from the indicated line 13—13 at Fig. 10 to further illustrate the manner of inserting the grounding clip into the shell.

Figure 14 is a transverse sectional elevation view of the outlet shell per se as taken from the indicated line 14—14 at Fig. 12.

Figure 15 is a longitudinal sectional elevation view of a grounding adapter element illustrated at Figs. 7 and 8.

Referring more particularly to the construction illustrated at Figs. 1 through 6, the improved outlet 20 is mounted upon a floor duct 21 as an integral part thereof, and this outlet may be located either at a terminal end of the floor duct or at an intermediate portion of the duct with the duct continuing beyond the outlet as indicated by broken lines at Fig. 1.

This floor duct is formed as a longitudinal strip of rubber-like material having a flat bottom surface 22 which is adapted to be laid upon, and if desired, to be glued to a floor or other flat surface. The upper surface of this duct is crowned, with the central portion being comparatively thick to form a central longitudinal crown or ridge 23 and with the sides of the duct sloping from this ridge to comparatively thin side edges 24 at each side thereof to give the duct cross section a general shape of a flat triangle or similar flat crowned form. A passageway 25 extends longitudinally through the center of this duct to contain a pair of insulated conduit wires 26 which may be threaded into the duct. The rubber-like material forming this duct not only permits flexibility thereof, but is also a good electrical non-conductor and provides desirable moisture-proof encasement of the conduit wires 26.

The outlet 20 includes a shell 27 of rubber or rubber-like material similar to the material forming the floor duct 21 to obtain like desirable qualities of flexibility and nonconductivity and also to facilitate a good bond between the shell and the duct when the two are interconnected as hereinafter described. This shell 27 is preferably shaped as a symmetrical, rectangular-based, pyramidal frustum having sloping arched side walls 28 and sloping end walls 29 which approach each other to form a flat rectangular top 30 wherein two pair of plug sockets 31 are located each to receive the contact legs 32 of a conventional electric plug 33 as illustrated.

The base of the shell 27 is substantially the same width as the width of the duct 21 and is formed as a flat bottom 34 with overhanging ledges 35 at each end which are shaped to conform with the flat top surface of the duct 21, a portion of the bottom edge 34 and its overhanging ledge 35 being clearly illustrated at Fig. 3. To fit the shell upon the duct 21 a flat notch 36 is cut out of the ridged portion of the duct 21 which is of the same size as the bottom 34 and when this bottom 34 is placed in the notch 36 the ledges 35 lie upon the upper surface of the duct at each side of the notch. This provides a snug fit of the outlet upon the duct and the two units may be bonded together by any conventional welding or cementing operation. The resulting integrated assembly is compact and neat appearing.

Each pair of sockets 31 for an outlet plug such as 33 is oriented transversely across the top 30 and is near one end of the top to be positioned longitudinally opposite to the other opposing pair of sockets which are near the other end of the top. Each socket 31 comprises a relatively narrow slot-like entrance and a larger more nearly square pocket 37 therebelow which extends downwardly from this entrance to the bottom 34 of the shell as clearly illustrated at Fig. 6. Each pocket 37 is separated from its mating pocket by the wall of the shell but communicates with the corresponding pocket 37 of the opposite pair of sockets 31 by a longitudinal flat slot 38 at the bottom of the shell.

Each slot 38 and the communicating pockets 37 connected thereby are adapted to receive a U-shaped connector 39 which is proportioned to fit tightly into the slot and pockets. This connector includes a horizontal bus bar 40 and an upstanding arm 41 at each end thereof. The bar 40 lies in the slot 38 and arms 41 extend into the pockets 37. A spring clip 42 is affixed to each end of the bar 40 as by a rivet 43 to upstand alongside the arm 41 thereabove to form a clamp in connection therewith. A leg 32 of a plug 33 will move into this clamp when the plug is inserted into a socket, and the top corners of each clip 42 and arm 41 are turned outwardly from each other to facilitate receiving the leg 32.

A wire fastener 44 extends from the rivet 43 at each arm to connect with the end of an electrical wire 26. Since the duct passageway 25 terminates at the wall of the notch 36 of the duct 21, it is necessary to continue this passageway through the shell 27 to the fasteners 44. A way 45 is cut in each end of the shell along the bottom 34 which is sufficiently wide to reach both of the adjacent pockets 37 as illustrated at Fig. 5. This way is divided by a wall 46 so that the exposed and bare ends of the electrical wires 26 are positively separated where they are attached to the fasteners 44 of their respective connectors 39. By providing a way 45 at each end of the shell, connection of wires 26 to both ends of the connectors 39 is possible, as shown in broken lines at Fig. 3. This permits the outlet to be used at an intermediate position in the duct as well as at a terminal end thereof.

Assembly of this unit is comparatively simple in that the wires 26 are threaded through the floor duct passageway 25 to extend from the end of the passageway at the notch 36. The ends of the wires are then separated, bared of insulation and connected to the fasteners 44 of the connectors 39. The connectors are then inserted into their proper grooves and pockets in the shell and the shell is glued into position upon the duct. If the outlet is set at a notch 36 at an intermediate position in the duct, wires are extended into the passageway 25 from both ends of the duct to the notch. If, however, the notch is at the end of a duct so that only one set of wires is used, a plug 47 may be used to close off the terminal portion of the passageway, as shown at Fig. 3.

The constructions illustrated at Figs. 7 through 13 are further improvements of the outlet and duct to provide for a ground circuit. The conduit wires 26 are supplemented by a ground wire 50 which extends through the duct alongside the conduit wires. The modified outlet 20' shown at Figs. 7 through 9 and the further modified outlet 20" shown at Figs. 10 through 14, hereinafter further described in detail, are adapted to receive a conventional grounded electric plug 33a which includes a pair of spaced contact legs 32a and a depending ground leg 51 centrally offset from the contact legs of a type such as illustrated at Fig. 7.

In the construction shown at Figs. 7 through 9 and at Fig. 15 an adapter plug 52 is used in conjunction with a shell 27' formed substantially the same as that hereinbefore described, having side walls 28, end walls 29 and a top 30 with two pair of spaced sockets 31 therein. The adapter plug 52 is formed as a short cylindrical unit having a pair of depending contact legs 32' at the underside which extend into a pair of sockets 31 at the top of the shell 27'. The top surface of this adapter plug includes a pair of sockets 31' which receives the legs 32a of the grounded plug 33a and a ground socket 53 which receives the ground leg 51. The circuits through this plug 52 connect each leg 32 with a socket 31' and there is included a laterally outstanding connector bar 54 which includes a connector clip 54' in the ground socket 53, and an orifice 54" at its outstanding end, as illustrated at Fig. 15.

The bar 54 lies between the sockets 31' and is proportioned to extend the eyelet 54" to the center of the shell top 30 and to a post 55 upstanding therefrom. The shell 27' is modified from the construction hereinbefore described by the provision of the centrally upstanding ground post 55 whereto the ground eyelet 54" of a plug 52 may be connected, with the plug 52 being in either of the pairs of sockets 31 in the shell 27 or with plugs 52 in both of the pairs of sockets 31.

This post 55 is preferably a conventional-headed bolt which extends upwardly through the body of the shell. The head of the bolt is in a circular pocket 56 in the bottom of the shell with a washer 57 and a pair of fasteners 44' upon the bolt and against the head to lie in the socket. The threaded end of the bolt forming the post upstands from the top surface 30 and suitable nuts 58 may be threaded upon this end for attachment of the eyelet 54" thereto.

The bottom 34' of this modified shell 27' includes the pockets 37 and slots 38 which are adapted to receive connectors 39 as hereinbefore described, and also includes a central longitudinal slot 59 at each side, extending from the ways 45 at each end of the bottom to the central pocket 56. The ground wire 50 from the duct will lie in a slot 59 to the central pocket for connection with a fastener 44' from either side of the outlet or from both sides thereof if the outlet is at an intermediate position in the duct, as clearly illustrated at Fig. 9.

The construction illustrated at Figs. 10 through 13 provides for a further modification of the shell 27" to directly accommodate a grounded plug 33a at either end of the shell. This shell 27" is formed substantially the same as hereinbefore described. The top 30 is modified, however, to include a pair of spaced sockets 31 at each end of the top, and a ground socket 53" centrally offset from each of the pair of sockets 31. Each ground socket 53" is thereby adapted to accommodate a ground leg 51 of a grounded plug 33a with the contact legs 32a of the plug being inserted into the regular sockets 31.

The shell 27" must be modified somewhat to accommodate the ground sockets 53", and the pockets 37" are offset and widened to include auxiliary chambers 60 at their bottom side, with the fasteners 44″ being attached to outer sides of the bar 40 from that previously shown. Otherwise the connectors 39″ fit in the pockets 37″ and slots 38″, the same as hereinbefore described. A U-shaped grounding connector 61 is adapted to lie in a central longitudinal slot 62 in the bottom 34″ of the shell 27″ with the legs 63 of the connector 61 fitting into the ground sockets 53″. The ground sockets are substantially cylindrical and extend from the top 30″ and through the shell 27″ to the slot 62 at the underside thereof. The connector 61 includes a central bus bar 64 having wire fasteners 44″ and the upstanding contact legs 63 at each end thereof. Each contact leg 63 is formed of two opposing members and it is contemplated that the legs 63 will be formed in a manner which provides a natural resilient gripping of the ground leg 51. It is also contemplated that the natural resilience of the shell 27″ may be used to hold the legs 62 in position and permit them to tightly grip a ground leg 51 that is inserted into the socket.

With this construction the way 45″ at each end of the shell must be somewhat wider than the way previously described and the wall 46″ between each way 45″ must also be wider to permit an effective separation of the contact wires 26 from the ground wire 50.

While we have described our invention in considerable detail, it is obvious that others skilled in the art can devise and build alternate and equivalent constructions which are within the scope and spirit of our invention. Therefore, we desire that our protection be limited not by the constructions herein illustrated and described, but only by the proper scope of the appended claims.

We claim:

1. In combination with a duct of rubber-like insulating material adapted to carry a pair of electrical wires and formed as a longitudinally-extended, ribbon-like member of uniform cross section, having a flat bottom surface and a crowned upper surface with a relatively thick central portion and thin side edges and a longitudinal duct passageway through the center portion wherein the wires lie and having further a flat, substantially-rectangular notch interrupting the crowned portion thereof with the duct passageway being exposed at the side of the notch; an outlet at the duct notch adapted to receive a pair of electrical plugs having a pair of contact legs and comprising a substantially-rectangular, flat-bottom shell of rubber-like insulating material adapted to be seated in the notch, a bifurcated passageway in the bottom of the shell connected with the duct passageway, with a wire in the duct passageway extending into each leg of the shell passageway, a pair of plug socket slots at each end of the shell in the top of the shell and extending into the shell with each slot being in communication with a leg of the bifurcated passageway, contact leg clips in each slot, a bus bar in each leg of the shell passageway interconnecting the corresponding clips of each pair of slots and being interconnected with an electrical wire extending from the duct passageway into a leg of the shell passageway.

2. In combination with a duct of rubber-like insulating material, adapted to carry a pair of electrical wires and a ground wire and formed as a longitudinally extended ribbon-like member of uniform cross section having a flat bottom surface and a crowned upper surface with a relatively thick central portion and thin side edges and a longitudinal duct passageway through the center portion wherein the wires lie and having further a flat, substantially-rectangular notch interrupting the crowned portion thereof with the duct passageway being exposed at the side of the notch; and outlet at the duct notch adapted to receive the contact legs of an electrical-plug-grounding-adapter and to connect with the ground loop of the adapter, and comprising a flat bottom shell of rubber-like insulating material adapted to be seated in the notch, a trifurcated passageway in the bottom of the shell connected with the duct passageway, a pair of plug socket slots in the top of the shell extending into the shell in communication with the outer legs of the shell passageway, a contact-leg clip in each slot with a wire extending from the duct passageway through each outer leg of the shell passageway and being connected to a contact-leg clip, and a ground post at the center of the outlet extending through the outlet from the center leg of the outlet passageway to upstand from the shell and being adapted to receive the grounding arm of the adapter, with the ground wire extending from the duct passageway, through the center leg of the shell passageway and to the post.

3. In combination with a duct of rubber-like insulating material, adapted to carry a pair of electrical wires and a ground wire and formed as a longitudinally extended ribbon-like member of uniform cross section having a flat bottom surface and a crowned upper surface with a relatively thick central portion and thin side edges and a longitudinal duct passageway through the center portion wherein the wires lie and having further a flat, substantially-rectangular notch interrupting the crowned portion thereof with the duct passageway being exposed at the side of the notch; an outlet at the notch adapted to receive an electrical plug having contact legs and an offset ground leg and comprising a flat bottom shell of rubber-like insulating material adapted to be seated in the notch, a trifurcated passageway in the bottom of the shell connected with the duct passageway, a pair of plug socket slots in the top of the shell extending into the shell in communication with the outer legs of the shell passageway, a contact-leg clip in each slot with a wire extending from the duct passageway through each outer leg of the shell passageway and being connected to a contact-leg clip and a central offset slot in the top of the shell adapted to receive the grounding leg of the plug, extending into the shell in communication with the centered passageway and a contact-leg clip in the central slot with the ground wire extending from the duct passageway through the central leg of the shell passageway and being connected with the clip.

4. In combination with a duct of rubber-like insulating material adapted to carry a pair of electrical wires and formed as a longitudinally extended ribbon-like member of uniform cross section having a bottom mounting surface, a relatively thick portion through which a duct passageway extends, wherein the wires lie, and having further a flat substantially rectangular notch interrupting the thickened portion thereof with the duct passageway being exposed at the side of the notch, an outlet for a pair of electrical plugs having spaced contact legs comprising a flat-bottom shell of rubber-like insulating material adapted to be seated in the notch, a longitudinally disposed widened passageway in the bottom of the shell connected with the duct passageway, a pair of transversely disposed plug socket slots near each end of the shell and extending from the top of the shell into the shell and to the passageway, a pair of bus bars within the shell passageway and at each side thereof to lie substantially in spaced parallelism with each other, and an upstanding contact clip at each end of each bus bar extending into a plug socket slot and being adapted to receive the leg of an electrical plug, and with said electrical wires in the duct extending into the passageway with each wire being interconnected to a bus bar.

References Cited in the file of this patent

UNITED STATES PATENTS

| | | |
|---|---|---|
| 2,175,147 | Davison | Oct. 3, 1939 |
| 2,391,409 | Geist et al. | Dec. 25, 1945 |
| 2,636,520 | Geist et al. | Apr. 28, 1953 |

FOREIGN PATENTS

| | | |
|---|---|---|
| 541,718 | Great Britain | Dec. 9, 1941 |
| 1,092,462 | France | Nov. 10, 1954 |